United States Patent
Sandhu et al.

(10) Patent No.: US 9,369,902 B1
(45) Date of Patent: Jun. 14, 2016

(54) SYSTEM AND METHOD FOR IDENTIFYING DEVIATING CELL-SITES

(71) Applicant: Global Technology Associates, LLC, Reston, VA (US)

(72) Inventors: Sandip Sandhu, San Diego, CA (US); Behrouz Heshmatipour, Alisa Viejo, CA (US); Dmitry Kondrashuk, Poway, CA (US)

(73) Assignee: Global Technology Associates, LLC, Reston, VA (US)

( * ) Notice: Subject to any disclaimer, the term of this patent is extended or adjusted under 35 U.S.C. 154(b) by 0 days.

(21) Appl. No.: 14/833,128

(22) Filed: Aug. 23, 2015

(51) Int. Cl.
*H04W 24/02* (2009.01)
*H04W 24/04* (2009.01)
*H04W 16/00* (2009.01)
*H04W 36/00* (2009.01)
*H04W 24/08* (2009.01)

(52) U.S. Cl.
CPC .................... *H04W 24/08* (2013.01)

(58) Field of Classification Search
CPC ..... H04W 24/02; H04W 4/22; H04W 76/007; H04W 4/06; H04W 4/021; H04W 24/10; H04W 24/08; H04W 88/18; H04W 16/00; H04H 20/59; H04H 60/66; H04H 60/64
See application file for complete search history.

(56) References Cited

U.S. PATENT DOCUMENTS

| | | | | |
|---|---|---|---|---|
| 8,032,620 B2* | 10/2011 | Scott | .................. | H04L 41/0631 709/223 |
| 8,498,954 B2* | 7/2013 | Malov | ................ | G06Q 30/0201 703/2 |
| 8,768,369 B2* | 7/2014 | Eskicioglu | ............ | H04W 48/18 370/352 |
| 9,167,453 B2* | 10/2015 | Kapnadak | ............. | H04W 24/04 |
| 9,204,329 B2* | 12/2015 | Boyle | ................... | H04W 24/10 |
| 9,247,436 B2* | 1/2016 | Moore | .................. | H04W 24/02 |
| 2013/0143542 A1* | 6/2013 | Kovvali | ............... | H04W 48/18 455/418 |
| 2014/0153418 A1* | 6/2014 | Hariharan | ............. | H04W 24/10 370/252 |

* cited by examiner

*Primary Examiner* — Pablo Tran
(74) *Attorney, Agent, or Firm* — Symbus Law Group; Charles B. Lobsenz

(57) ABSTRACT

A method of identifying idiosyncratic performance-outliers amongst a plurality of cell-sites in a wireless network, the method comprising: selecting cell-sites; selecting, for each cell-site, at least one sector-carrier; selecting, for each sector-carrier, one or more KPIs; determining, for each KPI, a historical value and a recent value based on samples of the KPI taken during a historical period and a recent period, respectively, the recent period being a subset of the historical period; determining, for each KPI, a delta representing a difference between the historical value and the recent value thereby determining KPI-specific sets of deltas, respectively; normalizing each set of deltas; selecting, for each set of deltas, a KPI-specific threshold; comparing, for each set of deltas, members thereof against the corresponding threshold; and identifying, for each set of deltas, which combinations of cell-site and sector-carrier are KPI-specific performance outliers based on the comparison, respectively.

30 Claims, 10 Drawing Sheets

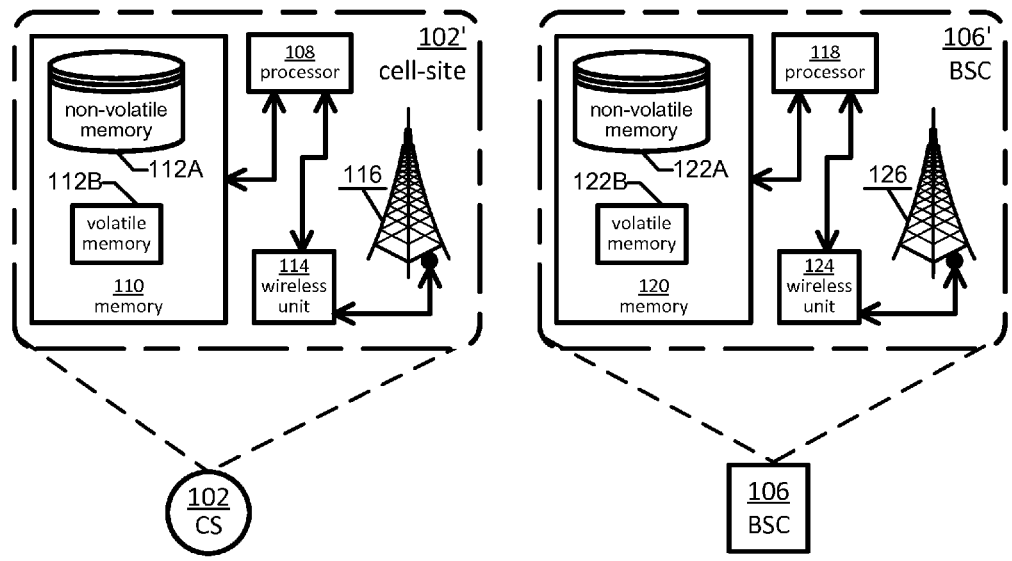
FIG. 1B
(Background Art)
FIG. 1C
(Background Art)
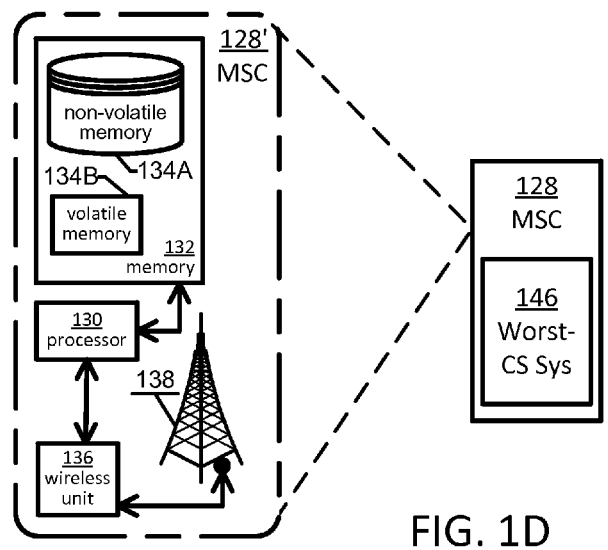
FIG. 1D
(Background Art)

SYSTEM AND METHOD FOR IDENTIFYING DEVIATING CELL-SITES

FIELD OF THE DISCLOSURE

Embodiments of the present invention relate to identifying idiosyncratic performance-outliers amongst a plurality of cell-sites in a wireless network.

BACKGROUND

FIG. 1A is a block diagram, according to the Background Art, of a wireless network 100, e.g., a cellular network. FIG. 1B is a block diagram, according to the Background Art, of a cell-site. FIG. 1C is a block diagram, according to the Background Art, of a base station controller (BSC). And FIG. 1D is a block diagram, according to the Background Art, of mobile switching center (MSC). For simplicity of illustration of, FIGS. 1A-1D assume the context of a CDMA wireless network technology.

In FIG. 1A, wireless network 100 includes cells 104 as well as cell-sites (or base transceiver stations (BTSs)) 102. Cells 104 represent the geographical areas of cellular coverage provided by different combinations of cell-sites 102, respectively. For ease of illustration, cells 104 are depicted as hexagons. Cell-sites 102 are located at many (though not necessarily at all) of the corners of cells 104.

In terms of physical components (as illustrated by exploded view 102' of FIG. 1B), each cell-site 102 includes: one or more instances of a processor 108; memory 110 which itself includes one or more instances of non-volatile memory 112A and one or more instances of volatile memory 112B; one or more instances of a wireless unit 114; and a tower 116 which itself includes one or more instances of an antenna (not illustrated in FIG. 1B) mounted thereon, e.g., a directional antenna. Typically (though not necessarily), the geographic area of a given one of cells 114 represents a combination of areas covered by two or more sectors (not illustrated in FIG. 1A), with each sector being provided by a different one of cell-sites 102, respectively. Typically (though not necessarily), a given one of cell-sites 102 includes at least three instances of wireless unit 114 and at least three instances of an antenna mounted on tower 116 so as to provide cellular coverage of at least three sectors (arranged radially 120 degrees apart) in at least three of cells 104, respectively.

Pairings of an instance of wireless unit 114 and its corresponding instance of an antenna mounted on tower 116 can reflect different and/or the same wireless communication technologies, respectively. For example, such wireless communication technologies include: GSM; CDMA; EVDO; LTE, etc.

Wireless network 100 further includes base station controllers (BSCs) 106 and at least one mobile switching center (MSC) 128. Typically, though not necessarily, an instance of BSC 106 controls multiple cell-sites 102. Typically, an instance of MSC 128 is connected to multiple instances of BSC 106. MSC 128 (and thus any instances of BSC 106 connected thereto, respectively) is typically connected via a backhaul network 140 to a public switched telephone network (PSTN) 142 and to the internet 144. Between MSC 128 and PSTN 142, backhaul network 140 can be comprised of wired and/or wireless connections. Similarly, between MSC 128 and internet 144, backhaul network 140 can be comprised of wired and/or wireless connections.

In terms of physical components (as illustrated by exploded view 106' in FIG. 1C), BSC 106 includes: one or more instances of a processor 118; and memory 120 which itself includes one or more instances of non-volatile memory 122A and one or more instances of volatile memory 122B. Typically, a given instance of BSC 106 not only engages in wired communication, but also communicates wirelessly; accordingly, the given instance of BSC 106 can further include: one or more instances of a wireless unit 124; and a tower 126 which itself includes one or more instances of an antenna (not illustrated in FIG. 1C) mounted thereon, e.g., a directional antenna.

In terms of physical components (as illustrated by exploded view 128' in FIG. 1D), each MSC 128 includes: one or more instances of a processor 130; and memory 132 which itself includes one or more instances of non-volatile memory 132A and one or more instances of volatile memory 132B. If a given instance of MSC 128 not only engages in wired communication, but also communicates wirelessly, then the given instance of MSC 128 further includes: one or more instances of a wireless unit 136; and a tower 138 which itself includes one or more instances of an antenna (not illustrated in FIG. 1D) mounted thereon, e.g., a directional antenna.

MSC 128, in terms of functional units, includes (among other things) a worst-cell-site (worst-CS) system 146. At least in part, worst-CS system 146 can be implemented, e.g., as executable code stored in one or more of memories 134A-134B, with such code being executable by one or more instances of processor 130.

Within wireless network 100, there are various sources (not illustrated) of measurable indicia from which metrics data can be gathered, e.g., various performance assessment units (not illustrated) in wireless network 100 which assess the performance of cell-sites 102 in terms of one or more key performance indicators (KPIs), respectively, and make the results of such KPI assessments available across wireless network 100. Worst-CS system 146 is configured: to compare the results of such KPI assessments of two or more of cells 102 over one or more defined sampling periods, respectively; group the results according to respective KPI; and organize each KPI-specific group of results into numerical order. Based on such organization of each group of KPI-specific results, a user can more easily recognize the worst performing instances of cell-site 102.

SUMMARY

It is to be understood that both the following summary and the detailed description are exemplary and explanatory and are intended to provide further explanation of the present invention as claimed. Neither the summary nor the description that follows is intended to define or limit the scope of the present invention to the particular features mentioned in the summary or in the description. Rather, the scope of the present invention is defined by the appended claims.

In certain embodiments, the disclosed embodiments may include one or more of the features described herein.

An aspect of the present invention provides a method of identifying idiosyncratic performance-outliers amongst a plurality of cell-sites in a wireless network, the method comprising: selecting cell-sites; selecting, for each cell-site, at least one sector-carrier; selecting, for each sector-carrier, one or more KPIs; determining, for each KPI, a historical value and a recent value based on samples of the KPI taken during a historical period and a recent period, respectively, the recent period being a subset of the historical period; determining, for each KPI, a delta representing a difference between the historical value and the recent value thereby determining KPI-specific sets of deltas, respectively; normalizing each set of deltas; selecting, for each set of deltas, a KPI-specific threshold; comparing, for each set of deltas, members thereof against the corresponding threshold; and identifying, for each set of deltas, which combinations of cell-site and sector-carrier are KPI-specific performance outliers based on the comparison, respectively.

Another aspect of the present invention provides apparatus for identifying idiosyncratic performance-outliers amongst a plurality of cell-sites in a wireless network, the apparatus comprising: a user-interface (UI) configured to: facilitate a selection of cell-sites; facilitate a selection, for each cell-site, of at least one sector-carrier; and facilitate a selection, for each sector-carrier, of one or more KPIs; an idiosyncrasy generator configured to determine, for each KPI, a historical value and a recent value based on samples of the KPI taken during a historical period and a recent period, respectively, the recent period being a subset of the historical period; a difference unit configured to determine, for each KPI, a delta representing a difference between the historical value and the recent value thereby determining KPI-specific sets of deltas, respectively; a normalizer configured to normalize each set of deltas; wherein the UI is further configured to: facilitate a selection, for each set of deltas, of a KPI-specific threshold; a comparator configured to compare, for each set of deltas, members thereof against the corresponding threshold; and an identifier unit configured to identify, for each set of deltas, which combinations of cell-site and sector-carrier are KPI-specific performance outliers based on the comparison, respectively.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments of the present invention will be more particularly described in conjunction with the following drawings wherein:

FIG. 1B is a block diagram, according to the Background Art, of a cell-site;

FIG. 1C is a block diagram, according to the Background Art, of a base station controller (BSC);

FIG. 1D is a block diagram, according to the Background Art, of mobile switching center (MSC);

DETAILED DESCRIPTION

Figure 1A:
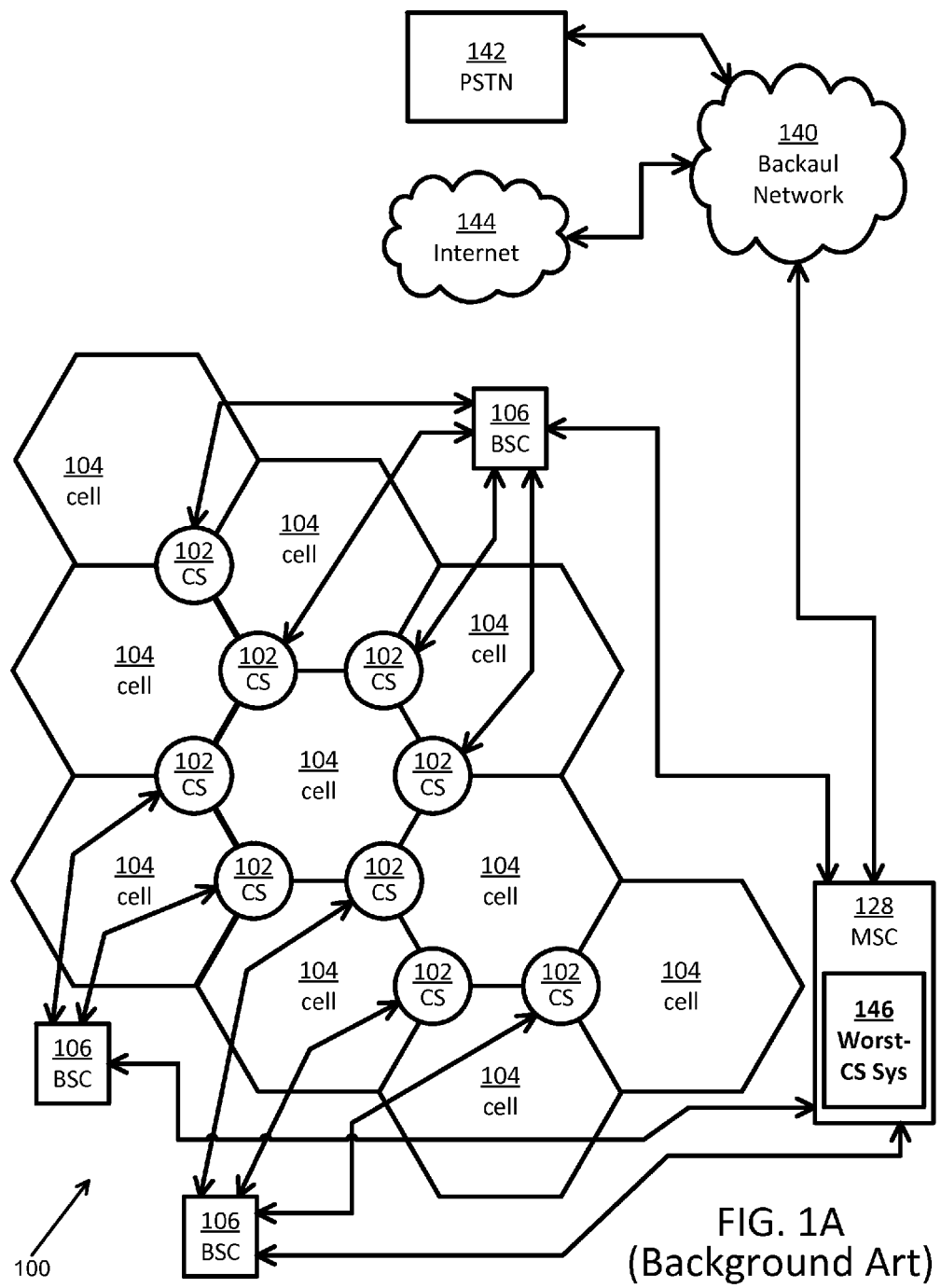
FIG. 1A is a block diagram, according to the Background Art, of a wireless network.

This specification discloses one or more embodiments that incorporate features of the present invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present invention. Thus, it is apparent that the present invention can be carried out in a variety of ways, and does not require any of the specific features described herein. Also, well-known functions or constructions are not described in detail since they would obscure the present invention with unnecessary detail.

The description is not to be taken in a limiting sense, but is made merely for the purpose of illustrating the general principles of the present invention, since the scope of the present invention is best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol. Examples of such networks include, PSTN, LAN, WAN, WiFi, WiMax, Internet, World Wide Web, Ethernet, other wireless and wired networks, and the like.

The phrase "wireless device" is used herein to mean one or more conventional or proprietary devices using radio frequency transmission techniques. Examples of such wireless devices include cellular telephones, desktop computers, laptop computers, handheld computers, electronic games, portable digital assistants, MP3 players, DVD players, or the like.

In developing embodiments of the present invention, among other things, the inventors thereof:

recognized that, while worst-CS system 146 according to the Background Art can assess the performance of a given instance of cell-site 102 relative to other instances of cell-site 102, nevertheless worst-CS system 146 cannot assess the short-term performance of the given instance of cell-site 102 relative to its idiosyncratic historical performance, i.e., cannot assess if the given instance of cell-site 102 is exhibiting normal or abnormal/deviating performance over the short-term relative to what represents its normal performance over a longer/historical period; and recognized that there are scenarios in which it would desirable to be able to assess such abnormal/deviating performance, e.g., including:

an 'edge' instance of cell-site 102 whose location (e.g., the edge of a coverage area on a highway, the edge where a plain meets a mountain range; etc.) makes it geographically difficult to achieve KPI-specific performance results comparable to other instances of cell-site 102 in wireless network 100 such that a numerical ordering of KPI-specific results produced by worst-CS system 146 would always tend to list the 'edge' instance of cell-site 102 as the worst performer irrespective of whether it is performing better or worse relative to its idiosyncratic historical performance;

an instance of cell-site 102 which experiences transient but substantial spikes in cellular communication demands from users, with the KPI-specific performance results during the spikes being so poor as to skew substantially the average of the KPI-specific performance results over the corresponding sampling periods; and as between first and second numerical orderings of a given KPI-specific group of results sampled at a first time, T1, and at a later second time, T2, respectively, IF there is a change in the numerical ordering between the first and second groups, for example, first and second instances cell-site 102 change places (e.g., in the numerical ordering, the first instance of cell-site 102 moves down from an $i^{th}$ position (position i) to an $(i+1)^{th}$ (position i–1) and the second instance of cell-site 102 correspondingly moves up from the $(i-1)^{th}$ position (position i–1) to the $i^{th}$ position (position i)), THEN it would be desirable to be able to identify the cause of the change; however, based only on the first and second numerical orderings (i.e., based only on the output of worst-CS system 146), a user can only infer, at best, that the cause of the change between the first and second numerical orderings is one of three possible explanations, namely, the (1) only the first instance of cell-site 102 experienced a change (that being a negative change) in performance sufficient to lower its position in the numerical ordering, (2) only the second instance of cell-site 102 experienced a change (that being a positive change) in performance sufficient to raise its position in the numerical ordering, and (3) both the first and second instances of cell-site 102 experienced changes (those being negative and positive changes, respectively,); sufficient to lower and raise their positions in the numerical ordering, respectively.

Accordingly, one or more embodiments of the present invention provide a method of and an apparatus for identifying idiosyncratic performance-outliers amongst a plurality of cell-sites in a wireless network.

Figure 2A:
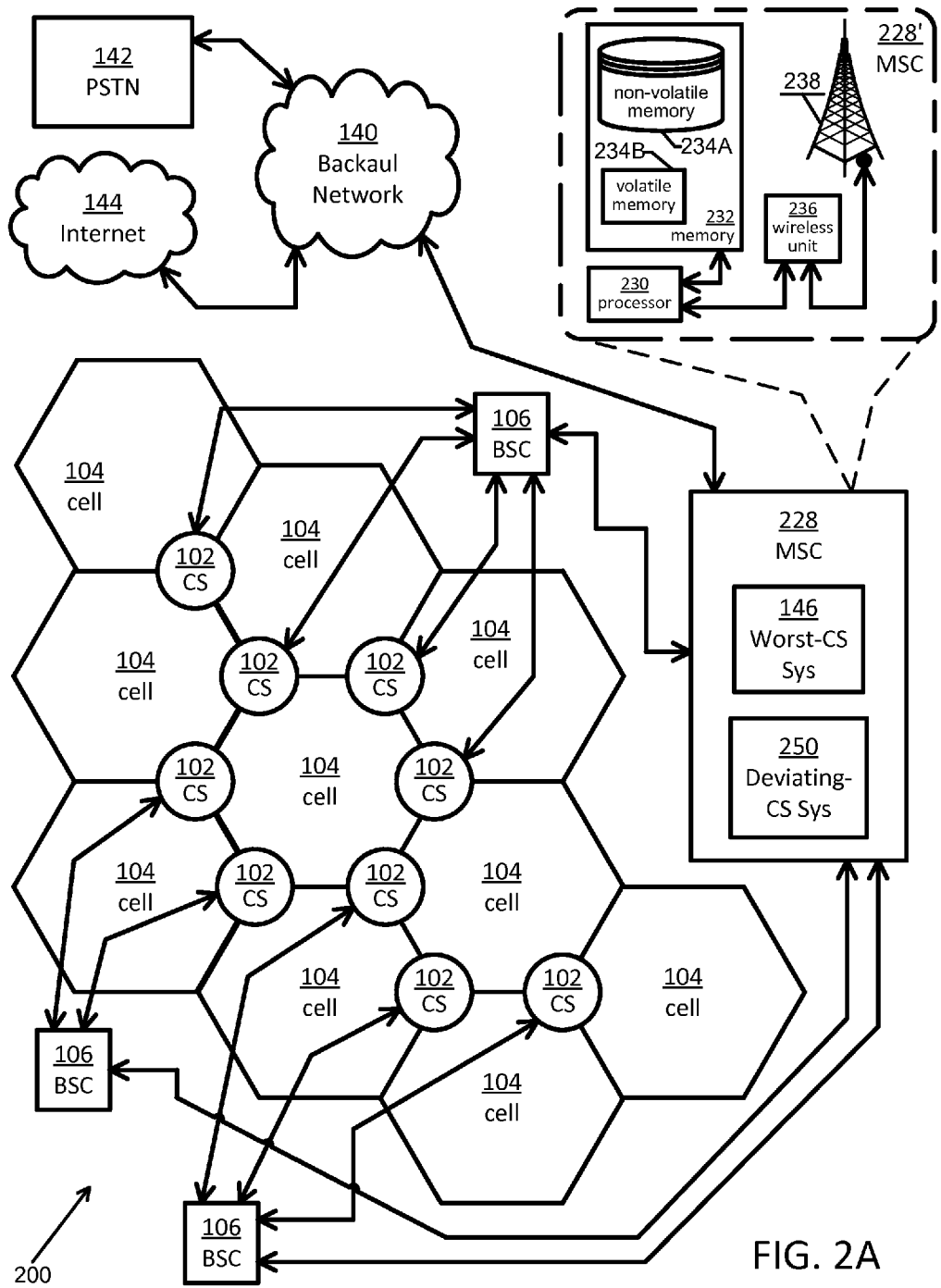
FIG. 2A is a block diagram, according to an embodiment of the present invention, of a wireless network that includes a deviating-CS system.

FIG. 2A is a block diagram, according to an embodiment of the present invention, of a wireless network 200 that includes a deviating-CS system 250.

Wireless network 200 of FIG. 2A is similar to wireless network 100 of FIG. 1A in that it includes cells 104, cell-sites (or base transceiver stations (BTSs)) 102 and BSCs 106. For the sake of brevity, further discussions of the details of components which wireless network 200 shares in common with wireless network 100 are not provided here; rather the reader is referred to the discussion (above) of FIG. 1A.

Also included in wireless network 200 is a mobile switching center (MSC) 228, which has similarities and differences with respect to MSC 128 of FIG. 1A. In terms of physical components (as illustrated by exploded view 228'), each MSC 228 includes: one or more instances of a processor 230; and memory 232 which itself includes one or more instances of non-volatile memory 234A and one or more instances of volatile memory 234B. Typically, a given instance of MSC 228 not only engages in wired communication, but also communicates wirelessly; accordingly, the given instance of MSC 228 can further include: one or more instances of a wireless unit 236; and a tower 238 which itself includes one or more instances of an antenna (not illustrated in FIG. 2A) mounted thereon, e.g., a directional antenna.

Like MSC 128 of wireless network 100, MSC 228 includes worst-CS system 146. Among other things, however, wireless network 200 differs from wireless network 100 in that MSC 228 further includes a deviating-CS system 250. Deviating-CS system 250 is an example of an apparatus for identifying idiosyncratic performance-outliers amongst cell-sites 102 in wireless network 200.

Similar to worst-CS system 146, at least in part, deviating-CS system 250 can be implemented, e.g., as executable code stored in one or more of memories 234A-234B, with such code being executable by one or more instances of processor 230. Deviating-CS system 250 is discussed in more detail below.

Figure 2B:
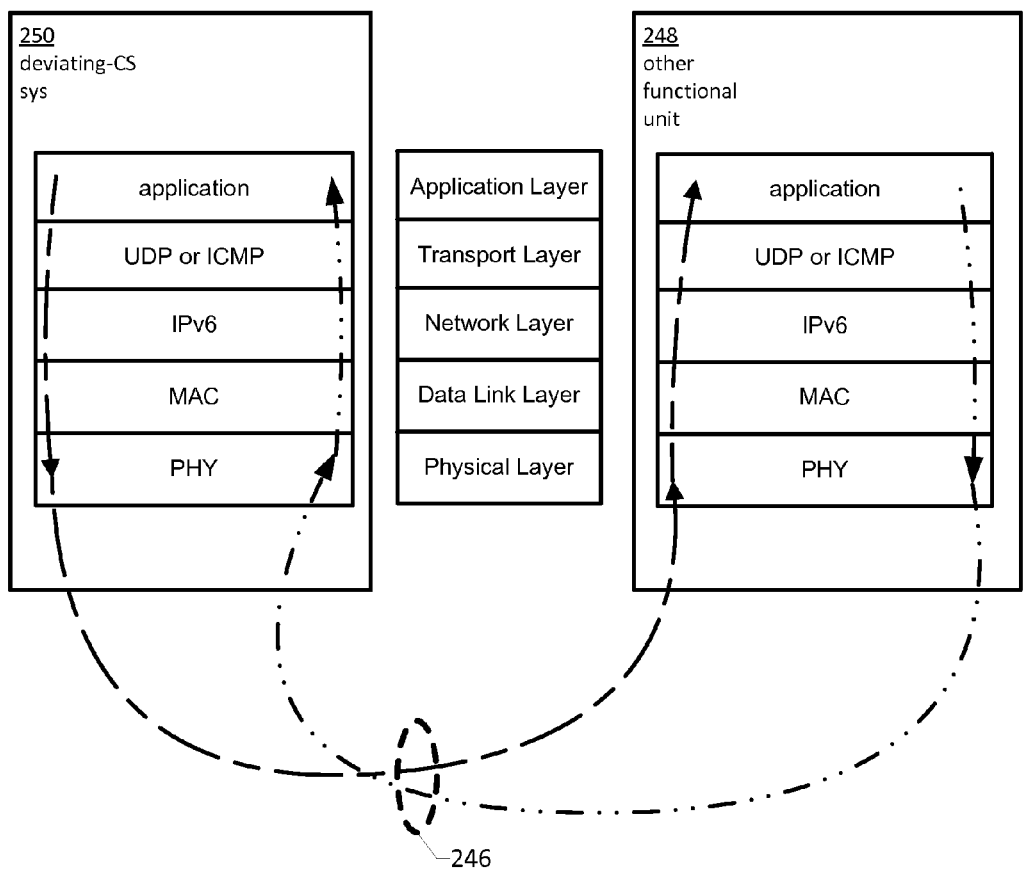
FIG. 2B is a communication-layer diagram illustrating the path of flow during an instance of a communication session between, e.g., a deviating-CS system and an instance of some other functional unit.

FIG. 2B is a communication-layer diagram illustrating the path of flow during an instance of a communication session 246 between, e.g., deviating-CS system 250 and an instance of some other functional unit 248, e.g., worst-CS system 146, according to an embodiment of the present invention.

Deviating-CS system 250 (as noted above) and the instance of other functional unit 248 can be implemented at least in part, e.g., as executable code stored in one or more of the noted (above) memories thereof and executed by one or more of the noted (above) processor units thereof, respectively. Such implementations can conform to the communication-layer diagram of FIG. 2B.

More particularly, deviating-CS system 250 and the instance of other functional unit 248 can have a stack based (in part) on industry-standard layers. The layers illustrated in FIG. 2B represent but one example of combinations of layers that can be included in such stacks, respectively. Such layers, from bottom to top, for example (as illustrated in FIG. 2B), can include: a physical layer; a data link (or MAC) layer; a network layer (e.g., an IP layer); a transport layer (e.g., a UDP layer or ICMP layer); and an application layer. Alternatively, different combinations of layers could be used in the stack.

Figure 2C:
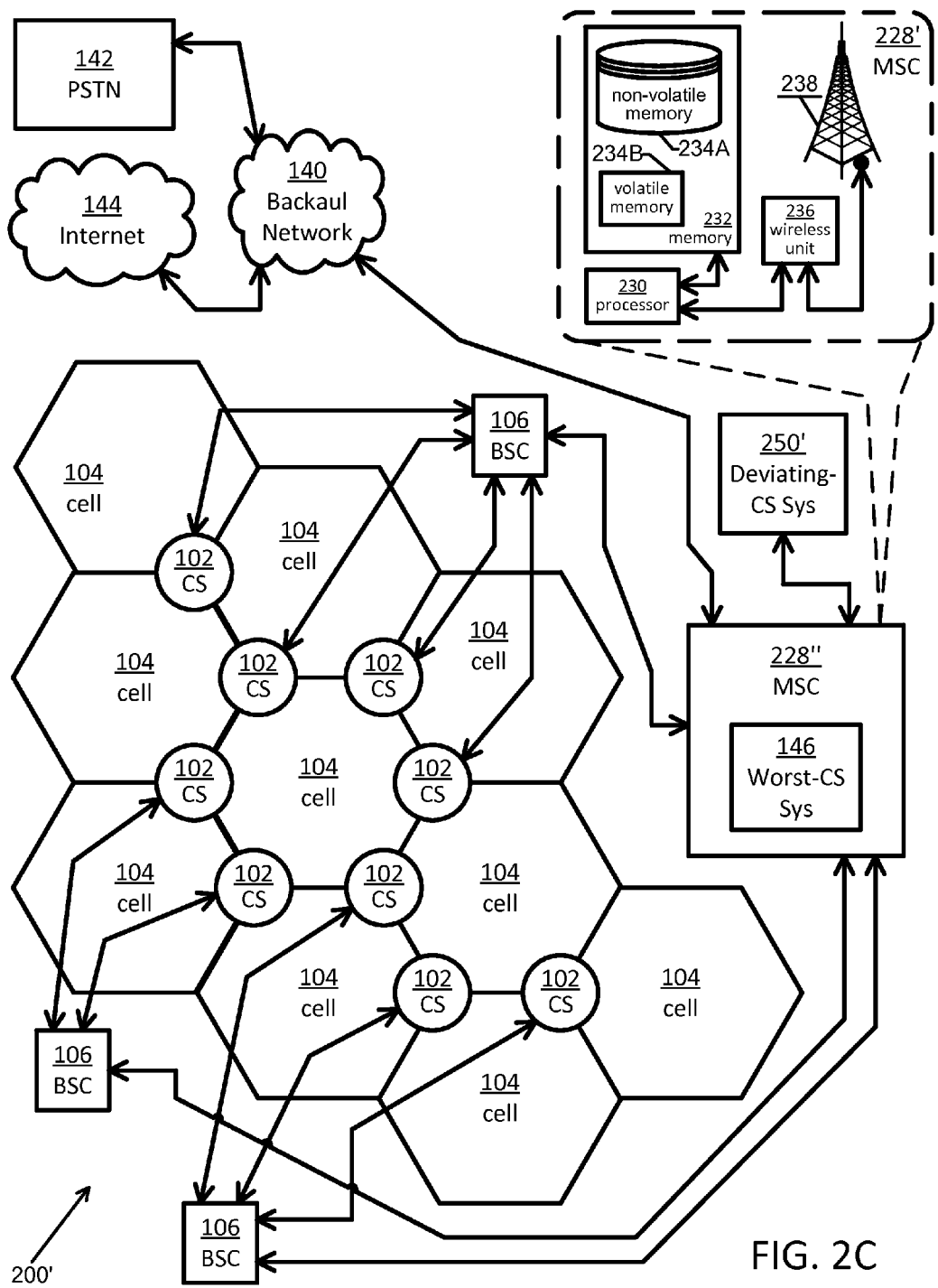
FIG. 2C is a block diagram, according to an embodiment of the present invention, of another wireless network that includes another deviating-CS system.

FIG. 2C is a block diagram, according to an embodiment of the present invention, of a wireless network 200' that includes a deviating-CS system 250'.

Wireless network 200' of FIG. 2C is similar to wireless network 200 of FIG. 2A in that it includes a deviating-CS system 250'. In contrast to deviating-CS system 250 of wireless network 200 (which is located within MSC 228), deviating-CS system 250' of wireless network 200' is located outside of MSC 228".

It is noted that FIGS. 2A and 2C assume the context of CDMA wireless network technology, for simplicity of illustration. Such an illustrative context, however, is not intended to be limiting. Embodiments of the present invention are also well suited to being implemented in other wireless networking technologies, e.g., LTE, etc., and/or in wired networking technologies.

Figure 3:
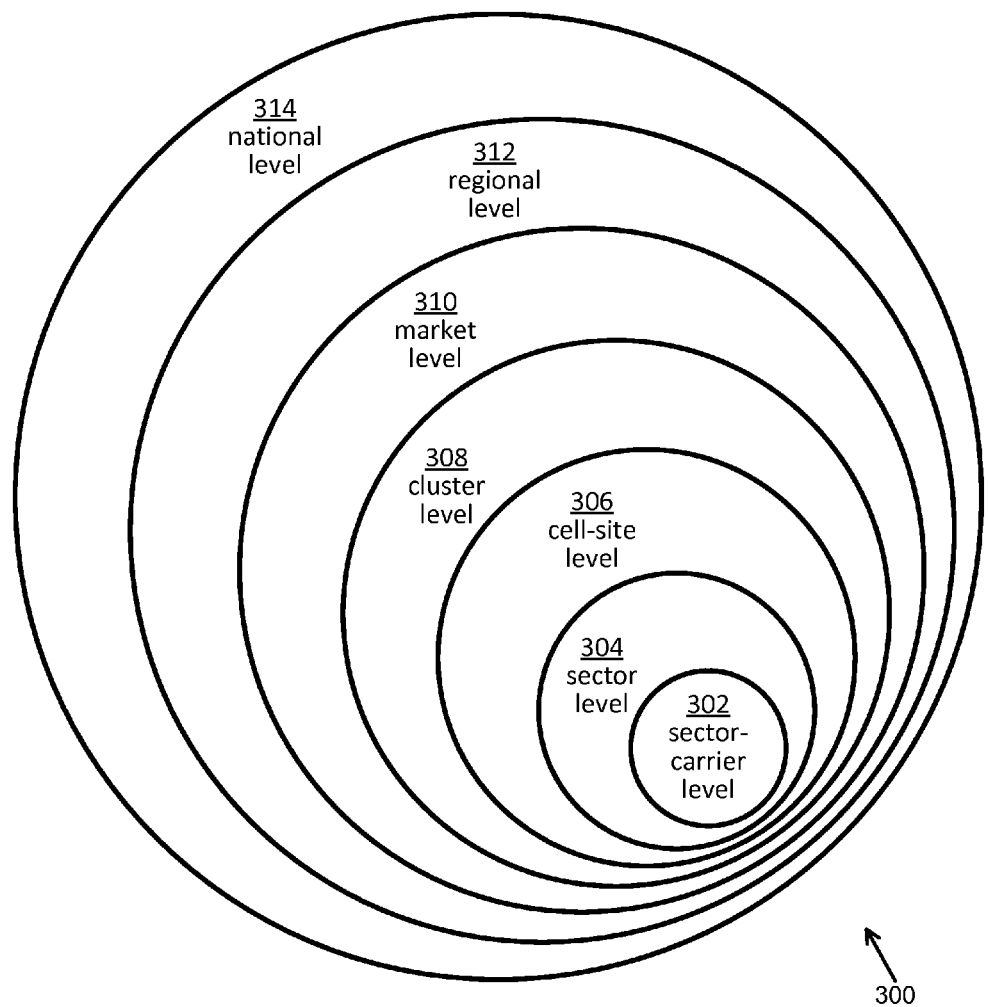
FIG. 3 is a Venn diagram denoting a hierarchy of measurable indicia from which metrics data can be gathered and then analyzed.

FIG. 3 is a Venn diagram 300 denoting relative levels of scope the hierarchy of measurable indicia from which metrics data, e.g., KPI data, can be gathered and then analyzed by deviating-CS system 250/250'. Alternatively, FIG. 3 can be regarded as denoting levels of scope to which a wireless network can be extended.

In FIG. 3, Venn diagram 300 includes: sector-carrier level 302; sector level 304; cell-site level 306; cluster level 308 (it being assumed that a cluster includes multiple cell-sites); market level 310 (it being assumed that a market includes multiple clusters); regional level 312 (it being assumed that a region includes multiple markets); and national level 314 (it being assumed that a 'nation' includes multiple regions). Regional level 312 is a smaller scope than national level 314, hence regional level 312 is a subset of national level 314. In other words, regional level $312 \subseteq$ national level 314. Market level 310 is a smaller scope than regional level 312, hence market level 310 is a subset of regional level 312. In other words, market level $310 \subseteq$ regional level 312, and thus market level $310 \subseteq$ national level 314, i.e., market level $310 \subseteq$ regional level $312 \subseteq$ national level 314. Cluster level 308 is a smaller scope than market level 310, etc., such that sector-carrier level $302 \subseteq$ sector level $304 \subseteq$ cell-site level $306 \subseteq$ cluster level $308 \subseteq$ market level $310 \subseteq$ regional level $312 \subseteq$ national level 314.

Viewed alternatively, some of the levels in Venn diagram 300 can be regarded as representative of geographic areas. Accordingly, the areas corresponding to some of the various levels of FIG. 3 can be described as relating as follows: area(sector level 304) $\subseteq$ area(cell-site level 306) $\subseteq$ area(cluster level 308) $\subseteq$ area(market level 310) $\subseteq$ area(regional level 312) $\subseteq$ area(national level 314).

Returning to FIG. 2A, MSC 228 (and included therein deviating-CS system 250) is typically located within the area (cluster level 308). By contrast, and returning to FIG. 2B, deviating-CS system 250' could be located in any of area (cluster level 308), area(market level 310), area(regional level 312) and area(national level 314).

Figure 4:
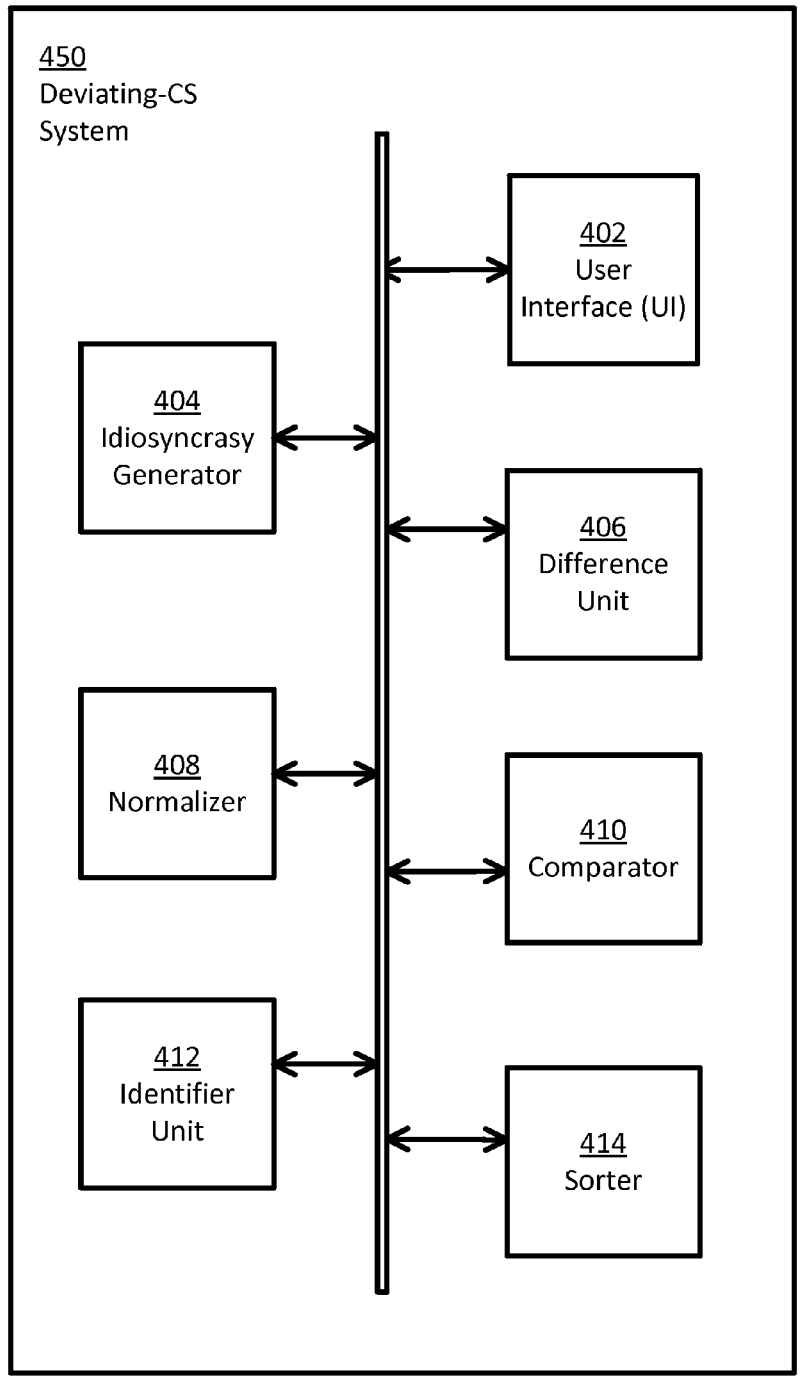
FIG. 4 is a block diagram, according to an embodiment of the present invention, of a deviating-CS system.

FIG. 4 is a block diagram, according to an embodiment of the present invention, of a deviating-CS system 450.

Deviating-CS system 450 is an example of an implementation of deviating-CS system 250 and/or deviating-CS system 250'.

In FIG. 4, deviating-CS system 250 includes: a user interface (UI) 402; an idiosyncrasy generator 404; a difference unit 406; a normalizer 408; a comparator 410; an identifier unit 412; and an optional sorter 414.

Similar to deviating-CS system 250, at least in part, deviating-CS system 450 (and thus the components included therein) can be implemented, e.g., as executable code stored in one or more of memories 234A-234B, with such code being executable by one or more instances of processor 230.

Deviating-CS system 450 is an example of an apparatus for identifying idiosyncratic performance-outliers amongst cell-sites 102 in a wireless network, e.g., wireless network 200 or 200'. UI 402 is configured to facilitate a user's interaction with deviating-CS 450. More particularly, UI 402 is configured to: facilitate a selection of cell-sites; facilitate a selection, for each cell-site, of at least one sector-carrier; and facilitate a selection, for each sector-carrier, of one or more key performance indicators (KPIs).

UI 402 can be yet further configured to: facilitate selection of at least one cluster, each cluster including one or more cell-sites 102, respectively; and facilitate selection, for each of the at least one cluster, amongst the one or more cell-sites 102 thereof. UI 402 can be yet further configured to: facilitate selection of at least one market, each market including clusters, respectively; and facilitate selection, for each of the at least one market, amongst the clusters thereof. UI 402 can be yet further configured to: facilitate selection of at least one region, each region including markets, respectively; and facilitate selection for each of the at least one region, amongst the markets thereof.

Again, KPIs examples of metrics. Particular examples of the KPIs include: a count of instances of a dropped connection between the cell-site and a wireless device (sometimes referred to as 'connection drops'); a count of instances of a failed attempt to establish a connection between the cell-site and a wireless device (sometimes referred to as 'blocks'); a count of minutes of connection time for all instances of a connection between the cell-site and a wireless device (sometimes referred to as 'MOU'); a count of data consumed for all instances of a connection between the cell-site and a wireless device (sometimes referred to as 'total traffic'); a value representative of throughput on a per-user basis for all instances of a connection between the cell-site and a wireless device (sometimes referred to simply as 'throughput'); or a count of simultaneously active instances of a connection between the cell-site and a wireless device (sometimes referred to as 'actives'). The specific KPIs listed above are merely examples; other KPIs can be used instead of or in addition to one or more of the specific KPIs listed above.

In addition, UI 402 can be further configured to assign weights to at least one of: the selected one or more KPIs, respectively; or the selected at least one sector-carrier. As a KPI-weighting example, a count of instances of a dropped connection between the cell-site and a wireless device could be weighted more highly than a count of instances of a failed attempt to establish a connection between the cell-site and a wireless device. As an example of sector-carrier weighting, LTE sector-carriers could be weighted more highly than EVDO sector-carriers. Under such an example of sector-carrier weighting, data gathered for a given KPI which happened to have been gathered for each of LTE and EVDO (e.g., a value representative of throughput on a per-user basis for all instances of a connection between the cell-site and a wireless device) would (in effect) be weighted more highly as it relates to LTE than as it relates to EVDO. Such weightings could be based, e.g., on marketing and/or business-management considerations, etc.

Idiosyncrasy generator 404 is configured to determine, for each KPI, a historical value and a recent value based on samples of the KPI taken during a historical period and a recent period, respectively. The recent period is a subset of the historical period. For example, the historical period can be 60 days and the recent period can be 24 hours. The historical value can be a representative value of the KPI on a daily basis. For example, the historical value can be an average (e.g., a daily average), a correlation (e.g., a daily correlation), a median (e.g., a daily median), etc.

As an option by which to improve the quality of the data gathered and then analyzed by deviating-CS system 450, idiosyncrasy generator 404 can be further configured to filter the samples taken during the historical period. For example, idiosyncrasy generator 404 can be further configured to: determine a standard deviation (STD) for the historical period; and exclude samples having a magnitude (m), K1*STD≤m, where K1 is a real number and, e.g., K1=5. As another example, idiosyncrasy generator 404 can be further configured to: determine an average (AVG) for the historical period; and exclude samples having, for example, a magnitude (m), K2*AVG≤m, where K2 is a real number and, e.g., K2=1.9.

Difference unit 406 is configured to determine, for each KPI, a delta representing a difference between the historical value and the recent value thereby determining KPI-specific sets of deltas, respectively. For example, assume that there are seven cell-sites 1-7, and that data is to be gathered and analyzed for the 'Connection Drops' KPI, i.e., a count of instances of a failed attempt to establish a connection between the cell-site and a wireless device. Hypothetical data for this example is provided in the following table, Table 1.

TABLE 1

Sorted According to Cell-Site Number

| Cell-Site | Tech | Parameter | Raw Value (24 hrs) | 60 day Avg | Delta |
|---|---|---|---|---|---|
| 1 | LTE | Connection Drop | 20000 | 500 | 19500 |
| 2 | LTE | Connection Drop | 35000 | 3000 | 32000 |
| 3 | LTE | Connection Drop | 10000 | 3500 | 6500 |
| 4 | LTE | Connection Drop | 3000 | 1500 | 1500 |
| 5 | LTE | Connection Drop | 2000 | 1984 | 16 |
| 6 | LTE | Connection Drop | 5000 | 3567 | 1433 |
| 7 | LTE | Connection Drop | 7000 | 2345 | 4655 |

Normalizer 408 is configured to normalize each set of deltas. Returning the discussion to UI 402, it is further configured to: facilitate a selection, for each set of deltas, of a KPI-specific threshold.

Normalizer 408 is further configured to use, e.g., a non-linear transfer function to normalize a given set of deltas. For example, the non-linear transfer function can approximate an exponential function, $y=abx$, where a is non-zero and b is a positive real number, $b>0$.

For the members of each set of deltas, normalizer 408 produces corresponding normalized values. For each set of deltas, normalizer 408 can be further configured to: use a range, R, for the normalized values, where R is a positive real number and $0 \leq R \leq \max(\text{range})$, e.g., $\max(\text{range})=100$; and sub-normalize, within the normalized range, into sub-ranges. For example, and for a given set of deltas, there could be three such sub-normalizations, including:

sub-normalizing instances of delta having values, X, onto a sub-range, r1, of the range R, where X is a subset of the given set of deltas, i.e., $X \subseteq$ given_set_of_deltas, $0 \leq r1 < \text{BOUNDARY1} < \max(\text{range})$, $0 \leq X < \text{REF1}$, and BOUNDARY1 and REF1 are positive real numbers, e.g., integers, respectively;

sub-normalizing instances of delta having values, Y, onto a sub-range, r2, of the range R, where $Y \subseteq \text{given\_set\_of\_deltas}$, the maximum instance of delta in X, max(X), is less than the minimum instance of delta in Y, min(Y), such that $\max(X) < \min(Y)$, $\text{BOUNARY1} \leq r2 < \text{BOUNDARY2} < \max(\text{range})$, $\text{REF1} \leq Y < \text{REF2}$, and BOUNDARY2 and REF2 are positive real numbers, e.g., integers, respectively; and sub-normalizing instances of delta having values, Z, onto a sub-range, r3, of the range R, where $Z \subseteq \text{given\_set\_of\_deltas}$, $\max(Y) < \min(Z)$, $\text{BOUNDARY2} \leq r3 \leq \max(\text{range})$, $\text{REF2} \leq Z \leq \max(\text{delta})$, max(delta) is the maximum value of delta, and max (range) and max(delta) are positive real numbers, e.g., integers.

Other numbers of sub-normalizations are contemplated, e.g., 8-10.

Let us expand the example introduced above in the context the hypothetical data (including values of delta) listed in Table 1 by subjecting the deltas to, e.g., four sub-normalizations. In particular, let us assume that max(range)=100, and let us further assume (as indicated below in Table 2): for the first sub-normalization, BOUNDARY1=90 and REF1=10,000; for the second sub-normalization, BOUNDARY2=95 and REF2=15,000; for the third sub-normalization, BOUNDARY3=98 and REF3=50,000; and for the fourth sub-normalization, BOUNDARY4=100 and 50,000<REF4.

TABLE 2

| Sub-Norm | Subset of Delta | Sub-Range |
| --- | --- | --- |
| First | $0 \leq W < \text{REF1}$, REF1 = 10k | $0 \leq r1 < \text{BOUNDARY1}$, BOUNDARY1 = 90 |
| Second | $\text{REF1} = 10k \leq X < \text{REF2}$, REF2 = 15k | $\text{BOUNDARY1} = 90 \leq r2 < \text{BOUNDARY2}$, BOUNDARY2 = 95 |
| Third | $\text{REF2} = 15k \leq Y < \text{REF3}$, REF3 = 50k | $\text{BOUNDARY2} = 95 \leq r3 < \text{BOUNDARY3}$, BOUNDARY3 = 98 |
| Fourth | $\text{REF3} = 50k \leq Y < \text{REF4}$, 50k < REF4 | $\text{BOUNDARY3} = 98 \leq r4 < \max(\text{range})$, max(range) = 100 |

Table 3 (printed below) expands Table 1 (printed above) to include the sub-normalized values determined according to the four sub-normalizations of Table 2 (printed above). Table 3 is sorted according to Cell-Site Number.

TABLE 3

Sorted According to Cell-Site Number

| Cell-Site | Tech | Parameter | Raw Value (24 hrs) | 60 day Avg | Delta | Sub-Normalized Value |
| --- | --- | --- | --- | --- | --- | --- |
| 1 | LTE | Connection Drop | 20000 | 500 | 19500 | 95.27 |
| 2 | LTE | Connection Drop | 35000 | 3000 | 32000 | 96.46 |
| 3 | LTE | Connection Drop | 10000 | 3500 | 6500 | 58.50 |
| 4 | LTE | Connection Drop | 3000 | 1500 | 1500 | 13.50 |
| 5 | LTE | Connection Drop | 2000 | 1984 | 16 | 0.14 |
| 6 | LTE | Connection Drop | 5000 | 3567 | 1433 | 12.90 |
| 7 | LTE | Connection Drop | 7000 | 2345 | 4655 | 41.90 |

Table 4 (printed below) represents a different sorting than is used in Table 3 (printed above). That is, Table 4 (printed below) is sorted according to Sub-Normalized value.

TABLE 4

Sorted According to Sub-Normalized Value

| Cell-Site | Tech | Parameter | Raw Value (24 hrs) | 60 day Avg | Delta | Sub-Normalized Value |
| --- | --- | --- | --- | --- | --- | --- |
| 2 | LTE | Connection Drop | 35000 | 3000 | 32000 | 96.46 |
| 1 | LTE | Connection Drop | 20000 | 500 | 19500 | 95.27 |
| 3 | LTE | Connection Drop | 10000 | 3500 | 6500 | 58.50 |
| 7 | LTE | Connection Drop | 7000 | 2345 | 4655 | 41.90 |
| 4 | LTE | Connection Drop | 3000 | 1500 | 1500 | 13.50 |
| 6 | LTE | Connection Drop | 5000 | 3567 | 1433 | 12.90 |
| 5 | LTE | Connection Drop | 2000 | 1984 | 16 | 0.14 |

Comparator 410 is configured to compare, for each set of deltas, members thereof against the corresponding threshold. Identifier unit 412 is configured to identify, for each set of deltas, which combinations of cell-site 102 and sector-carrier are KPI-specific performance outliers based on the comparison, respectively. The output of identifier unit 412, e.g., can be communicated to a user via UI 402. Optional sorter 414 is configured to sort each normalized set of deltas, e.g., into numerical order, which can facilitate easier recognition of outliers on the part of a user. The output of sorter 414, e.g., can be communicated to a user via UI 402. Identifier unit 412 can be further configured to recommend, for each performance-outlying combination of cell-site 102 and sector-carrier, a change in one or more operational settings of the combination that is intended to decrease the corresponding degree to which the combination is a performance-outlier.

Figure 5A:
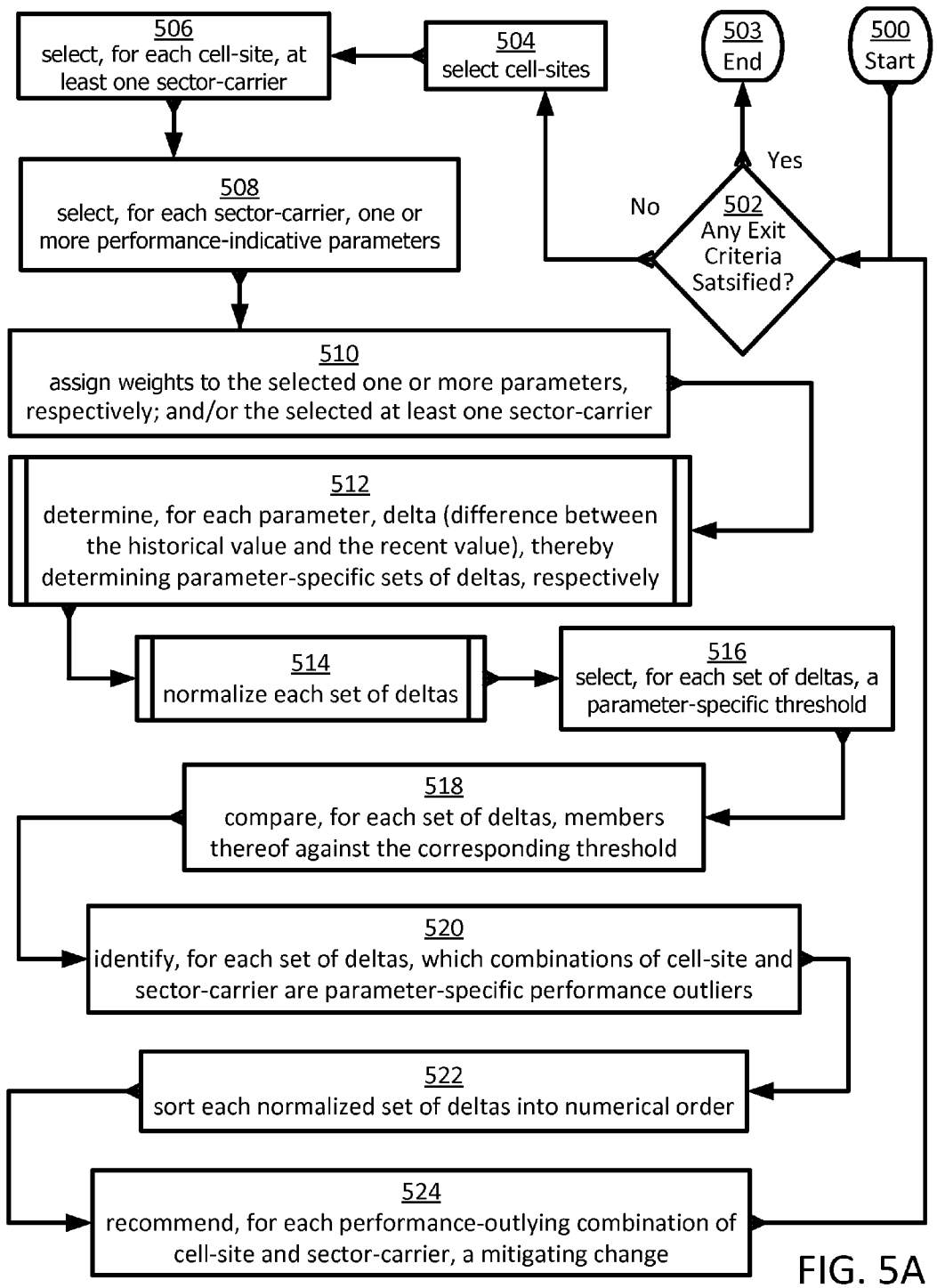
FIGS. 5A-5C are flowcharts, according to embodiments of the present invention, illustrating a method of identifying idiosyncratic performance-outliers amongst cell-sites in a wireless network.
Figure 5B:
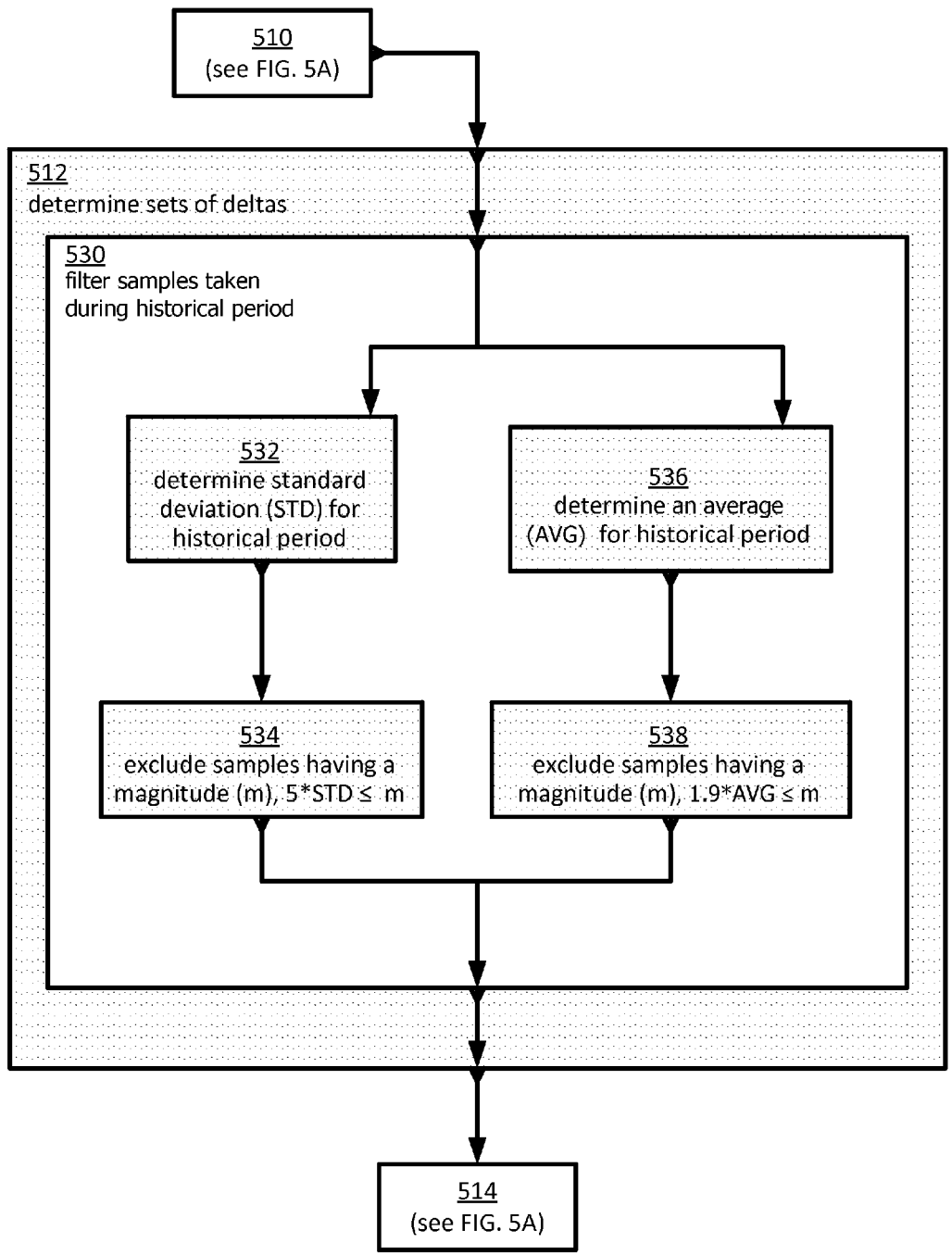
Figure 5C:
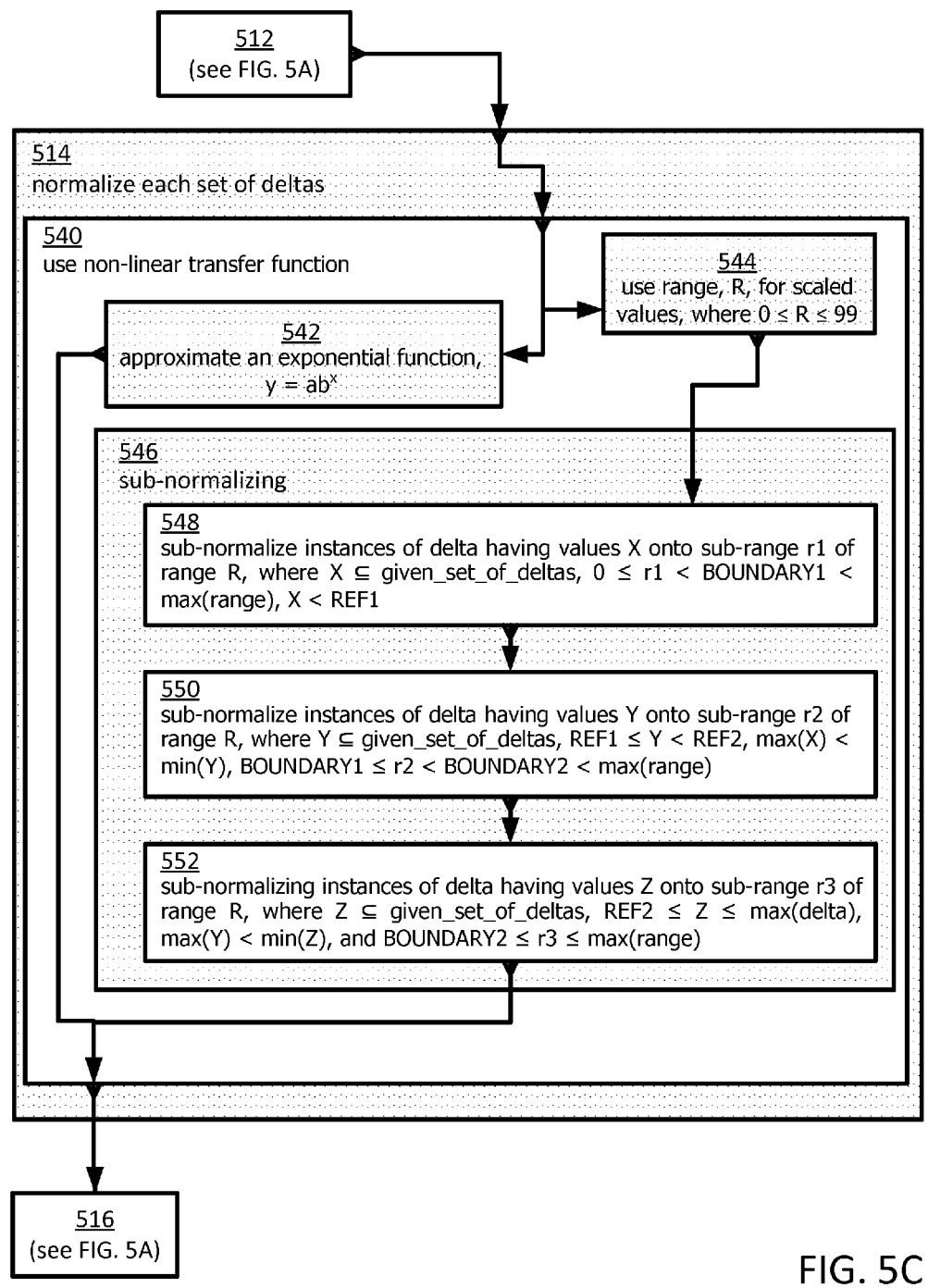

FIGS. 5A-5C are flowcharts illustrating a method, according to embodiments of the present invention, of identifying idiosyncratic performance-outliers amongst cell-sites 106 in a wireless network, e.g., wireless networks 200, 200', etc., with FIGS. 5B and 5C illustrating blocks of FIG. 5A in more detail, respectively.

In FIG. 5A, there is a loop. As a general design consideration, no loop should be infinite, i.e., inescapable. Accordingly, flow in FIG. 5A starts at block 500 and proceeds to a decision block 502, where processor 230 decides if any exit criteria have been satisfied. If the outcome of decision block 502 is yes (one or more of the exit criteria are satisfied), then flow proceeds to block 503 and ends. If the outcome of decision block 502 is no (none of the exit criteria has been satisfied), then flow proceeds to a block 504.

In block 504, via UI 402, a user selects cell-sites. From block 504, flow proceeds to a block 506. In block 506, via UI 402, a user selects, for each cell-site, at least one sector-carrier. From block 506, flow proceeds to a block 508. At block 508, via UI 402, the user selects, for each sector-carrier, one or more performance-indicative parameters, e.g., KPIs. From block 508, flow proceeds to an optional block 510. At block 510, via UI 402, the user assigns weights to one or more of the selected one or more KPIs, respectively, and/or one or more of the selected at least one sector-carrier, respectively. From block 510, flow proceeds to a block 512. If block 510 were not included, then flow would proceed from block 508 to block 512.

In block 512, idiosyncrasy generator 404 (e.g., running on processor 230) determines, for each KPI, a historical value and a recent value based on samples of the KPI taken during a historical period and a recent period, respectively. Typically, the recent period is a subset of the historical period. Block 512 is illustrated in more detail below in the context of FIG. 5B. From block 512, flow proceeds to a block 514.

In block 514, normalizer 408 (e.g., running on processor 230) normalizes each set of deltas. Block 514 is illustrated in more detail below in the context of FIG. 5C. From block 514, flow proceeds to a block 516.

In block 516, via UI 402, the user selects, for each set of deltas, a parameter-specific (e.g., KPI-specific) threshold. From block 516, flow proceeds to a block 518. In block 518, comparator 410 (e.g., running on processor 230) compares, for each set of deltas, members thereof against the corresponding threshold. From block 518, flow proceeds to a block 520. In block 520, identifier unit 412 (e.g., running on processor 230) identifies, for each set of deltas, which combinations of cell-site and sector-carrier are KPI-specific performance outliers based on the comparison, respectively. From block 520, flow proceeds to an optional block 522.

In block 522, sorter 414 (e.g., running on processor 230) sorts each normalized set of deltas, e.g., into numerical order. From block 522, flow proceeds to a block 524. In block 524, identifier unit 412 (e.g., via processor 230) recommends, for each performance-outlying combination of cell-site 102 and sector-carrier, a mitigating change, i.e., a change in one or more operational settings intended to decrease the corresponding degree to which the combination is a performance-outlier. From block 524, flow proceeds to loop back up to decision block 502. If block 524 were not included, then flow would proceed from block 520 to block 502.

As noted above, FIG. 5B illustrates block 512 in more detail.

In FIG. 5B, flow enters block 512 and proceeds to a block 530, where idiosyncrasy generator 404 (e.g., running on processor 230) filters the samples taken during the historical period. Flow proceeds inside of block 530 along two alternate path options. That is, inside block 530, flow can proceed to a block 532 or a block 536.

If flow proceeds to block 532, then idiosyncrasy generator 404 determines a standard deviation (STD) for the historical period. From block 532, flow proceeds to a block 534. In block 534, idiosyncrasy generator 404 excludes samples having a magnitude (m), $5*STD \leq m$, thereby filtering the samples taken during the historical period. From block 534, flow exits block 530 and block 512, and proceeds to block 514.

If flow proceeds to a block 536, then idiosyncrasy generator 404 determines an average (AVG) for the historical period. From block 536, flow proceeds a block 538. In block 538, idiosyncrasy generator 404 excludes samples having a magnitude (m), $1.9*AVG \leq m$. From block 538, flow exits block 530 and block 512, and proceeds to block 514.

As noted above, FIG. 5C illustrates block 514 in more detail.

In FIG. 5C, flow enters block 514 and proceeds to a block 540, where normalizer 408 (e.g., running on processor 230) uses a non-linear transfer function to normalize a given set of deltas. Flow proceeds inside of block 540 along two alternate path options. That is, inside block 530, flow can proceed to a block 542 or a block 544.

If flow proceeds to block 542, then normalizer 408 uses an approximation of the exponential function, y=abx; where a is non-zero, and b is a positive real number, b>0. From block 542, flow exits block 540 and block 514, and proceeds to block 516.

If flow proceeds to block 544, then normalizer 408 uses a range, R, for the scaled values (which result from the normalizing), where R is an integer and $0 \leq R \leq max(range)$, e.g., max (range)=100. From block 544, flow proceeds to a block 546, where normalizer 408 sub-normalizes, within the scaled range, into sub-ranges. For ease of illustration, FIG. 5C assumes that three sub-normalizations are included in block 546; of course, other numbers of sub-normalizations are contemplated. Within block 546, flow proceeds to a block 548, where normalizer 408 sub-normalizes instances of delta having values, X, where $0 \leq X < REF1$, e.g., REF1=10,000, onto a sub-range, r1, of the range R, where r1 is an integer and $0 \leq r1 < BOUNDARY1 < max(range)=10$, e.g., BOUNDARY1=60. From block 548, flow proceeds to a block 550, where normalizer 408 sub-normalizes instances of delta having values, Y, where $REF1=10,0000 \leq X < REF2$, e.g., REF2=20,000 and max(X)<min(Y), onto a sub-range, r2, of the range R, where r2 is an integer and $BOUNDARY1=60 \leq r2 < BOUNDARY2 < max(range)=100$, e.g., BOUNDARY2=80. From block 550, flow proceeds to a block 552, where normalizer 408 sub-normalizes instances of delta having values, Z, where r3 is an integer and $REF2=20,0000 \leq Z \leq max(delta)$ and max(Y)<min(Z), onto a sub-range, r3, of the range R, where $BOUNDARY2=80 \leq r3 < max(range) =100$. From block 552, flow exits block 540 and block 514, and proceeds to block 516.

Embodiments of the present invention have been discussed in the context of instances of cell-sites 102 as being typical examples of sources of measurable indicia from which metrics data (e.g., KPI data) can be gathered. It is noted that embodiments of the present invention can be implemented with other sources of measurable indicia from which metrics data can be gathered. For example, such other sources include transport components in wireless networks such as those used to connect to land-based wired networks, e.g., fiber networks and/or various backhaul implementations; IP-core elements in wireless networks, e.g., edge routers, subscriber authentication components such as VLRs and/or HLRs, packet gateways, etc.

As noted, embodiments of the present invention are well suited to being implemented in wireless and wired networking technologies. It is further contemplated that embodiments of the present invention can be implemented in systems other than networking systems under circumstances in which it is not sufficient to merely assess the performance of a given instance of an element in the system relative to other instances of the element in the system because doing so cannot assess the short-term performance of the given instance of the element relative to its idiosyncratic historical performance, i.e., cannot assess if the given element is exhibiting normal or abnormal/deviating performance over the short-term relative to what represents its normal performance over a longer/ historical period. For example, such a system might be an automobile engine, and such an element might be a particular kind of sensor, e.g., an oxygen sensor.

The present invention is not limited to the particular embodiments illustrated in the drawings and described above in detail. Those skilled in the art will recognize that other arrangements could be devised. The present invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present invention has been described with reference to specific illustrative embodiments, modifications and variations of the present invention may be constructed without departing from the spirit and scope of the present invention as set forth in the following claims.

While the present invention has been described in the context of methods and apparatuses (as noted above), those skilled in the art will appreciate that the mechanism of the present invention is capable of being implemented and distributed in the form of a computer-usable medium (in a variety of forms) containing computer-executable instructions, and that the present invention applies equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the invention. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A method of identifying idiosyncratic performance-outliers amongst a plurality of cell-sites in a wireless network, the method comprising:
    selecting cell-sites;
    selecting, for each cell-site, at least one sector-carrier;
    selecting, for each sector-carrier, one or more key performance indicators (KPIs);
    determining, for each KPI, a historical value and a recent value based on samples of the KPI taken during a historical period and a recent period, respectively, the recent period being a subset of the historical period;
    determining, for each KPI, a delta representing a difference between the historical value and the recent value thereby determining KPI-specific sets of deltas, respectively;
    normalizing each set of deltas;
    selecting, for each set of deltas, a KPI-specific threshold;
    comparing, for each set of deltas, members thereof against the corresponding threshold; and
    identifying, for each set of deltas, which combinations of cell-site and sector-carrier are KPI-specific performance outliers based on the comparison, respectively.

2. The method of claim 1, further comprising:
    sorting each normalized set of deltas into numerical order.

3. The method of claim 1, wherein at least one of the following is true:
    the historical period is 60 days; or
    the recent period is 24 hours.

4. The method of claim 3, wherein:
    the historical value is representative on a daily basis.

5. The method of claim 4, wherein:
    the historical value is one of:
        average;
        correlation; or
        median.

6. The method of claim 1, wherein the at least one KPI includes at least one of:
    a count of instances of a dropped connection between the cell-site and a wireless device;
    a count of instances of a failed attempt to establish a connection between the cell-site and a wireless device;
    a count of minutes of connection time for all instances of a connection between the cell-site and a wireless device;
    a count of data consumed for all instances of a connection between the cell-site and a wireless device;
    a value representative of throughput on a per-user basis for all instances of a connection between the cell-site and a wireless device; or
    a count of simultaneously active instances of a connection between the cell-site and a wireless device.

7. The method of claim 1, wherein the determining a historical value for each KPI includes:
    filtering the samples taken during the historical period.

8. The method of claim 7, wherein the filtering, for each KPI, includes:
    determining a standard deviation (STD) for the historical period; and
    excluding samples having a magnitude (m), $K1*STD \leq m$, where K1 is a real number and K1 is about 5.

9. The method of claim 7, wherein the filtering, for each KPI, includes:
    determining an average (AVG) for the historical period; and
    excluding samples having a magnitude (m), $K2*AVG \leq m$, where K2 is a real number and K2 is about 1.9.

10. The method of claim 1, wherein the normalizing includes:
    using a non-linear transfer function to normalize a given set of deltas.

11. The method of claim 10, wherein:
    the non-linear transfer function approximates an exponential function, $y=ab^x$;
    wherein:
        a is non-zero; and
        b is a positive real number, $b>0$.

12. The method of claim 10, wherein
    the normalizing produces, for members of each set of deltas, corresponding scaled values; and the normalizing, for a given set of deltas, further includes:
  using a range, R, for the scaled values, where R is an integer and $0 \leq R \leq max(range)$, and $max(range)=100$; and
  sub-normalizing, within the scaled range, into sub-ranges including:
    sub-normalizing instances of delta having values, X, onto a sub-range, r1, of the range R, where $X \subseteq given\_set\_of\_deltas$, $0 \leq r1 < BOUNDARY1 < max(range)$, $0 \leq X < REF1$, and BOUNDARY1 and REF1 are real numbers, respectively;
    sub-normalizing instances of delta having values, Y, onto a sub-range, r2, of the range R, where $Y \subseteq given\_set\_of\_deltas$, $max(X) < min(Y)$, $BOUNDARY1 \leq r2 < BOUNDARY2$, $BOUNDARY2 < max(range)$, $REF1 \leq Y < REF2$, and BOUNDARY2 and REF2 are real numbers, respectively; and
    sub-normalizing instances of delta having values, Z, onto a sub-range, r3, of the range R, where $Z \subseteq given\_set\_of\_deltas$, $max(Y) < min(Z)$, $BOUNDARY2 \leq r3 \leq max(range)$, $REF2 \leq Z \leq max(delta)$, max(delta) is a maximum value of delta, and max(range) and max(delta) are real numbers.

13. The method of claim 1, further comprising:
assigning weights to at least one of:
  the selected one or more KPIs, respectively; or
  the selected at least one sector-carrier, respectively.

14. The method of claim 1, further comprising:
recommending, for each performance-outlying combination of cell-site and sector-carrier, a change in one or more operational settings intended to decrease the corresponding degree to which the combination is a performance-outlier.

15. The method of claim 1, further comprising:
selecting, for each cell-site, at least one cell-sector; and
wherein the selecting at least one sector-carrier includes:
  selecting, for each cell-sector, at least one sector-carrier.

16. The method of claim 1, further comprising:
selecting at least one cluster, each cluster including cell-sites, respectively; and
wherein the selecting cell-sites includes:
  selecting, for each of the at least one cluster, amongst the cell-sites thereof.

17. The method of claim 16, further comprising:
selecting at least one market, each market including clusters, respectively; and
wherein the selecting at least one cluster includes:
  selecting, for each of the at least one market, amongst the clusters thereof.

18. The method of claim 17, further comprising:
selecting at least one region, each region including markets, respectively; and
wherein the selecting at least one market includes:
  selecting, for each of the at least one region, amongst the markets thereof.

19. An apparatus for identifying idiosyncratic performance-outliers amongst a plurality of cell-sites in a wireless network, the apparatus comprising:
  a user-interface (UI) configured to:
    facilitate a selection of cell-sites;
    facilitate a selection, for each cell-site, of at least one sector-carrier; and
    facilitate a selection, for each sector-carrier, of one or more KPIs;
  an idiosyncrasy generator configured to determine, for each KPI, a historical value and a recent value based on samples of the KPI taken during a historical period and a recent period, respectively, the recent period being a subset of the historical period;
  a difference unit configured to determine, for each KPI, a delta representing a difference between the historical value and the recent value thereby determining KPI-specific sets of deltas, respectively;
  a normalizer configured to normalize each set of deltas;
  wherein the UI is further configured to:
    facilitate a selection, for each set of deltas, of a KPI-specific threshold;
  a comparator configured to compare, for each set of deltas, members thereof against the corresponding threshold; and
  an identifier unit configured to identify, for each set of deltas, which combinations of cell-site and sector-carrier are KPI-specific performance outliers based on the comparison, respectively.

20. The apparatus of claim 19, further comprising:
a sorter configured to sort each normalized set of deltas into numerical order.

21. The apparatus of claim 19, wherein at least one of the following is true:
  the historical period is 60 days; or
  the recent period is 24 hours.

22. The apparatus of claim 19, wherein:
the historical value is one of:
  average;
  correlation; or
  median.

23. The apparatus of claim 19, wherein the at least one KPI includes at least one of:
  a count of instances of a dropped connection between the cell-site and a wireless device;
  a count of instances of a failed attempt to establish a connection between the cell-site and a wireless device;
  a count of minutes of connection time for all instances of a connection between the cell-site and a wireless device;
  a count of data consumed for all instances of a connection between the cell-site and a wireless device;
  a value representative of throughput on a per-user basis for all instances of a connection between the cell-site and a wireless device; or
  a count of simultaneously active instances of a connection between the cell-site and a wireless device.

24. The apparatus of claim 19, wherein the idiosyncrasy generator is further configured to:
filter the samples taken during the historical period.

25. The apparatus of claim 24, wherein the idiosyncrasy generator is further configured to:
  determine a standard deviation (STD) for the historical period; and
  exclude samples having a magnitude (m), $K1*STD \leq m$, where K1 is a real number and K1 is about 5.

26. The apparatus of claim 24, wherein the idiosyncrasy generator is further configured to:
  determine an average (AVG) for the historical period; and
  exclude samples having a magnitude (m), $K2*AVG \leq m$, where K2 is a real number and K2 is about 1.9.

27. The apparatus of claim 19, wherein the normalizer is further configured to:
  use a non-linear transfer function to normalize a given set of deltas.

28. The apparatus of claim 27, wherein:
the non-linear transfer function approximates an exponential function, $y=abx$;

wherein:
    a is non-zero; and
    b is a positive real number, b>0.

29. The apparatus of claim 27, wherein
the normalizing produces, for members of each set of deltas, corresponding scaled values; and
the normalizer, for a given set of deltas, is further configured to:
    use a range, R, for the scaled values, where R is an integer and $0 \leq R \leq \max(\text{range})$, and $\max(\text{range})=100$; and
    sub-normalize, within the scaled range, into sub-ranges including:
        sub-normalizing instances of delta having values, X, onto a sub-range, r1, of the range R, where $X \subseteq \text{given\_set\_of\_deltas}$, $0 \leq r1 < \text{BOUNDARY1} < \max(\text{range})$, $0 \leq X < \text{REF1}$, and BOUNDARY1 and REF1 are real numbers, respectively;
        sub-normalizing instances of delta having values, Y, onto a sub-range, r2, of the range R, where $Y \subseteq \text{given\_set\_of\_deltas}$, $\max(X) < \min(Y)$, $\text{BOUNDARY1} \leq r2 < \text{BOUNDARY2}$, $\text{BOUNDARY2} < \max(\text{range})$, $\text{REF1} \leq Y < \text{REF2}$, and BOUNDARY2 and REF2 are real numbers, respectively; and
        sub-normalizing instances of delta having values, Z, onto a sub-range, r3, of the range R, where $Z \subseteq \text{given\_set\_of\_deltas}$, $\max(Y) < \min(Z)$, $\text{BOUNDARY2} \leq r3 \leq \max(\text{range})$, $\text{REF2} \leq Z \leq \max(\text{delta})$, max(delta) is a maximum value of delta, and max(range) and max(delta) are real numbers.

30. The apparatus of claim 19, wherein the UI is further configured to:
    facilitate an assignment of weights to at least one of:
        the selected one or more KPIs, respectively; or
        the selected at least one sector-carrier.

* * * * *